(12) United States Patent
Fujita et al.

(10) Patent No.: US 7,027,377 B2
(45) Date of Patent: Apr. 11, 2006

(54) OPTICAL HEAD DEVICE AND OBJECTIVE LENS

(75) Inventors: Yuji Fujita, Nagano (JP); Kenichi Hayashi, Nagano (JP); Yoshifusa Miyasaka, Nagano (JP); Takahiro Azuma, Nagano (JP); Tetsuro Okamura, Nagano (DE)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 500 days.

(21) Appl. No.: 10/305,259

(22) Filed: Nov. 25, 2002

(65) Prior Publication Data

US 2003/0123369 A1    Jul. 3, 2003

(30) Foreign Application Priority Data

| Nov. 27, 2001 | (JP) | ............................. 2001-361085 |
| Nov. 29, 2001 | (JP) | ............................. 2001-363496 |
| Nov. 29, 2001 | (JP) | ............................. 2001-363497 |
| Nov. 29, 2001 | (JP) | ............................. 2001-363498 |
| Nov. 29, 2001 | (JP) | ............................. 2001-363499 |

(51) Int. Cl.
    *G11B 7/00*   (2006.01)

(52) U.S. Cl. .............................. 369/112.01; 369/112.08; 369/112.12

(58) Field of Classification Search ........... 369/112.01, 369/112.1, 112.08, 112.07, 112.12, 112.13, 369/112.15, 112.02, 44.23, 44.24

See application file for complete search history.

(56) References Cited

U.S. PATENT DOCUMENTS

| 5,883,873 A | * | 3/1999 | Morita | ................... 369/112.26 |
| 6,313,956 B1 | * | 11/2001 | Saito | ........................... 359/721 |

FOREIGN PATENT DOCUMENTS

| JP | 09-179020 | 7/1997 |
| JP | 2000-028917 | 1/2000 |

* cited by examiner

*Primary Examiner*—Nabil Hindi
(74) *Attorney, Agent, or Firm*—Hogan & Hartson, LLP

(57) ABSTRACT

An optical head device that converges first and second laser beams having different wavelengths on recording surfaces of first and second optical recording media through a single light converging optical system including an objective lens for recording or reproducing data on the recording surfaces. A refracting surface of the objective lens is divided into two regions, i.e., a central refracting surface region with an optical axis thereof being as a center and an outer circumferential refracting surface region that surrounds an outer circumference of the central refracting surface region. A diffraction grating is formed generally entirely over the central refracting surface region. When recording or reproducing data on the first optical recording medium using the first laser beam, a beam spot is formed with a diffracted beam obtained by the central refracting surface region. When recording or reproducing data on the second optical recording medium using the second laser beam, a beam spot is formed with a beam portion that passes the outer circumferential refracting surface region and a diffracted beam obtained by the central refracting surface region.

11 Claims, 14 Drawing Sheets

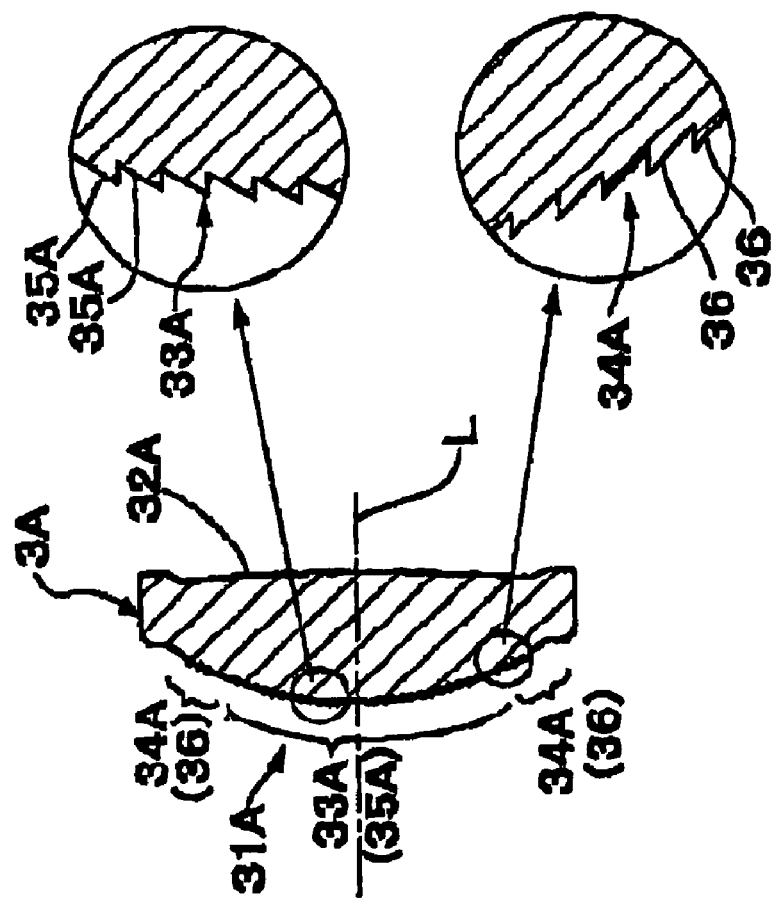

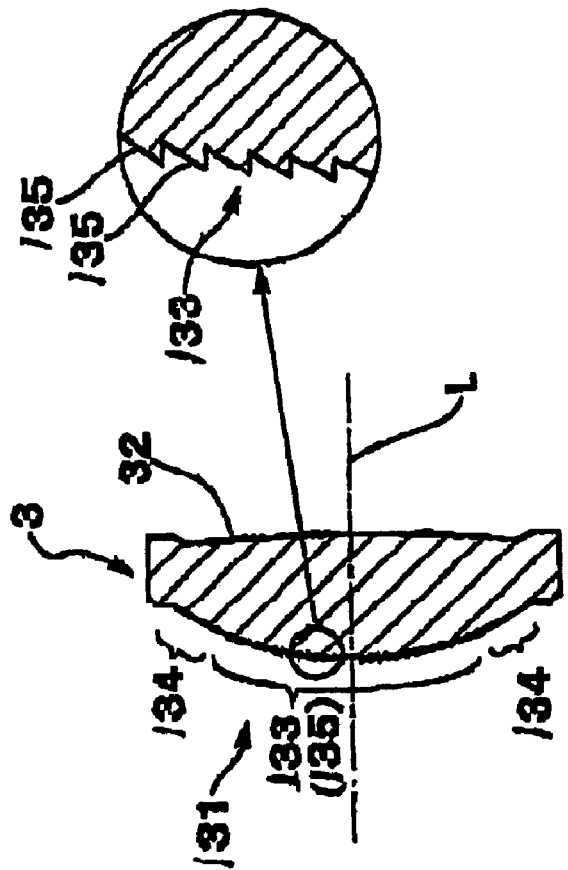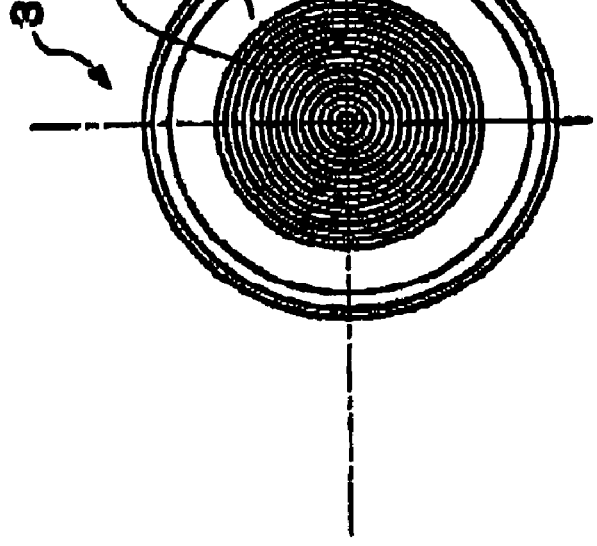

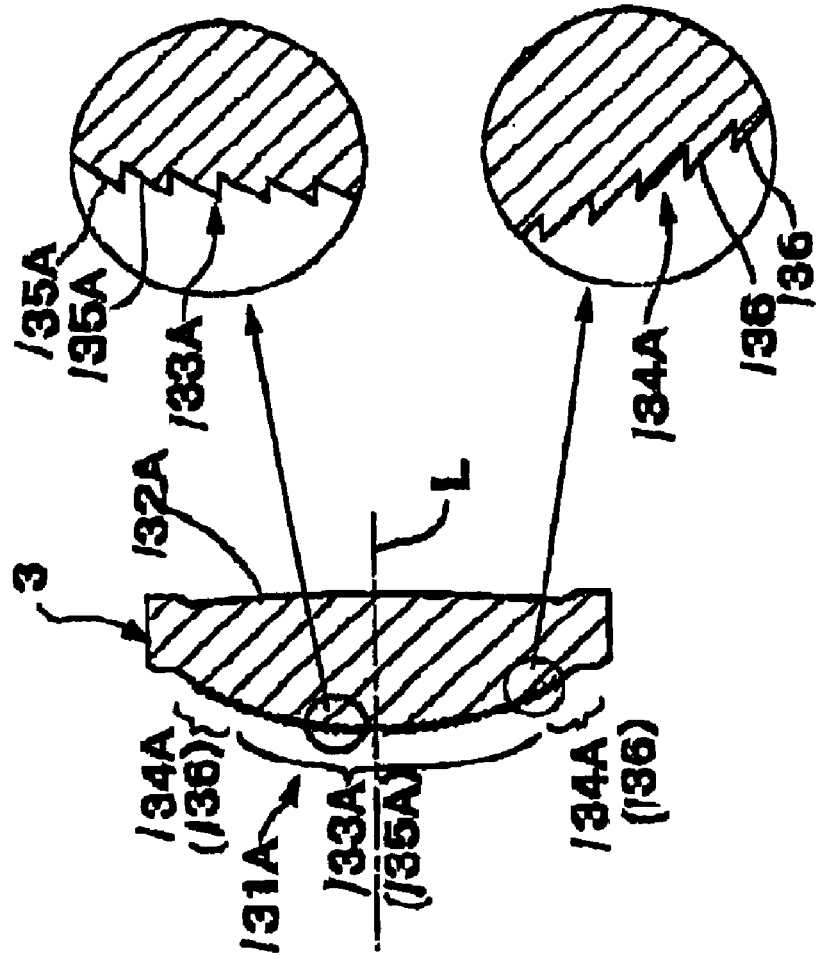
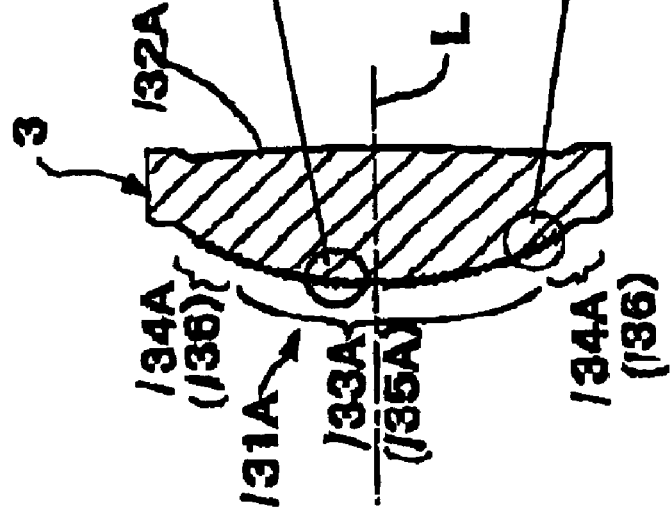
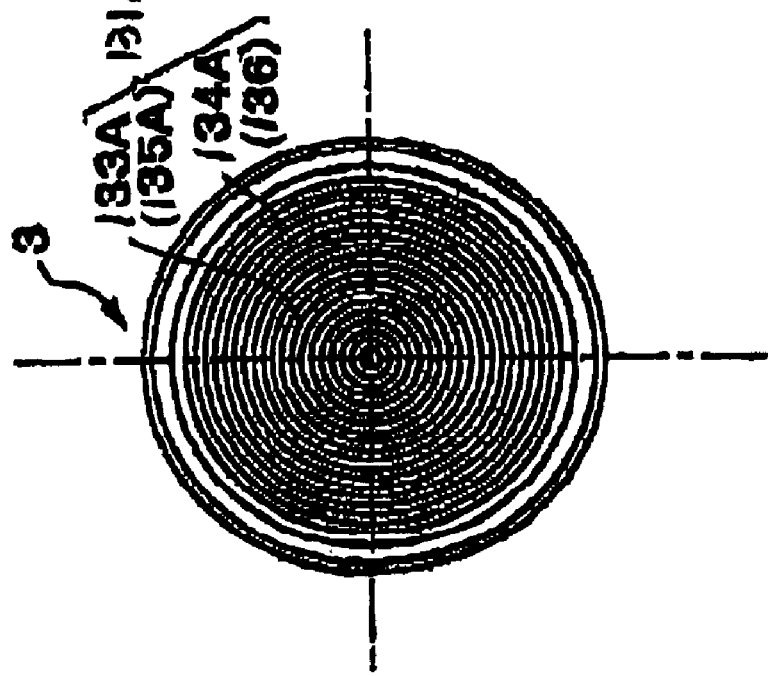

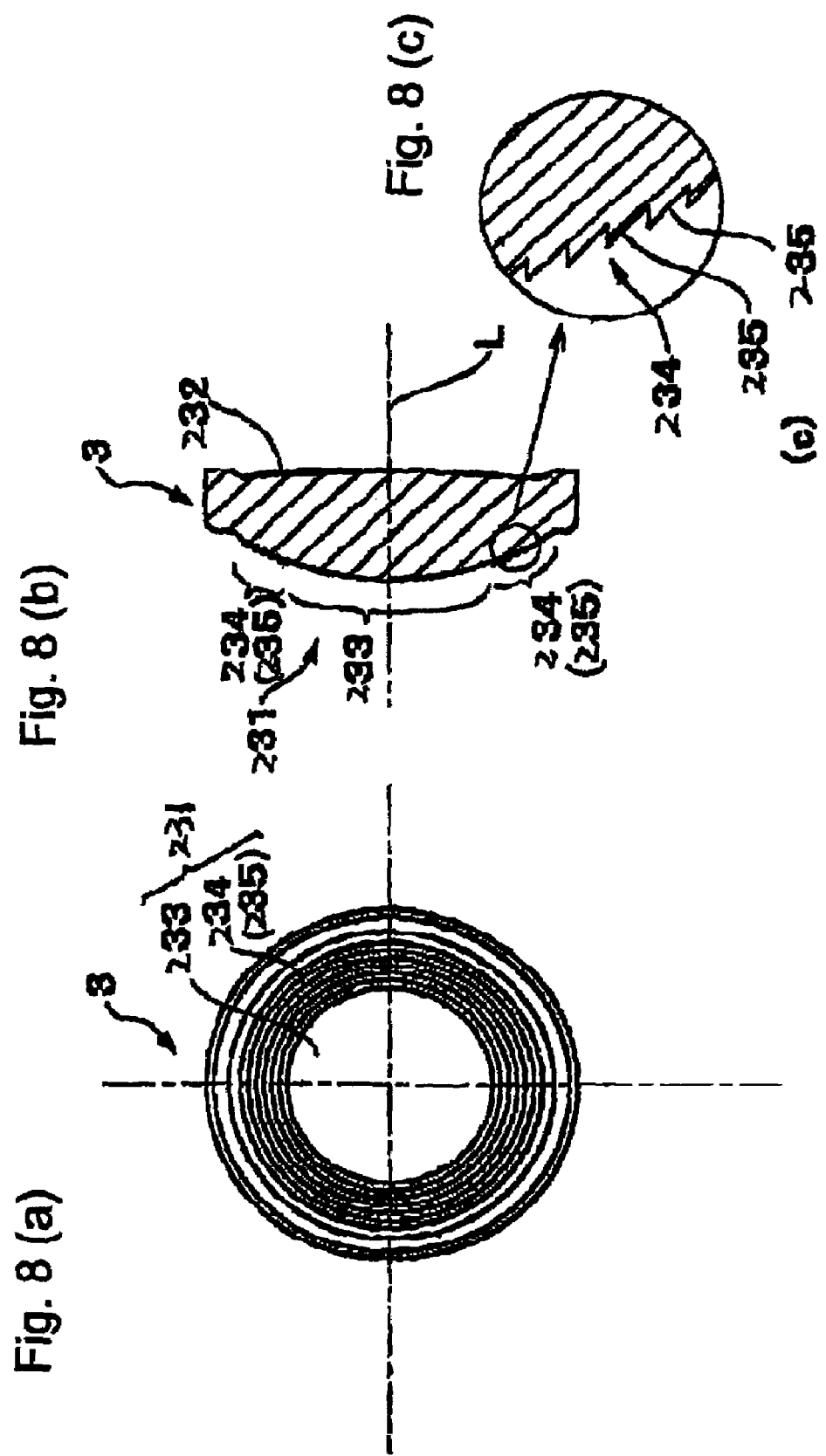

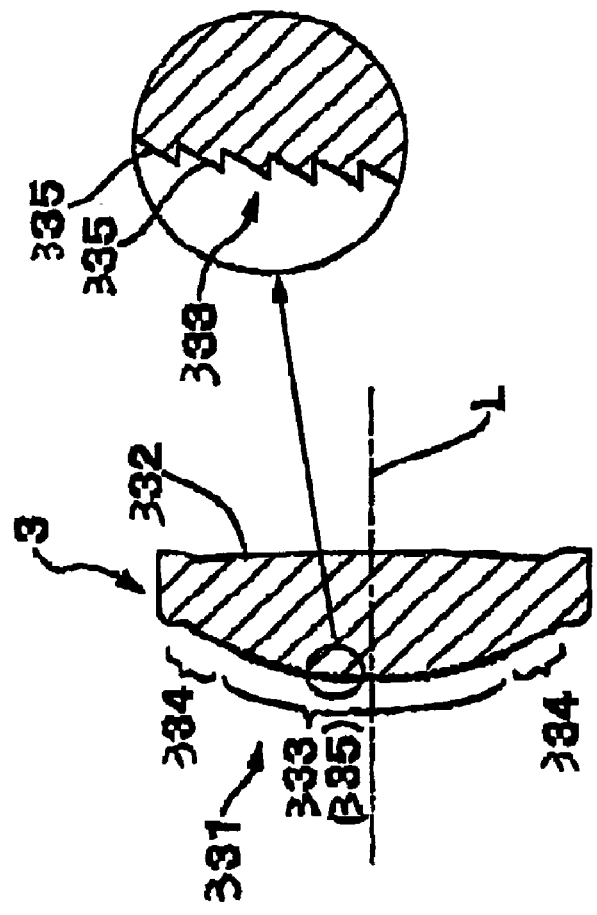
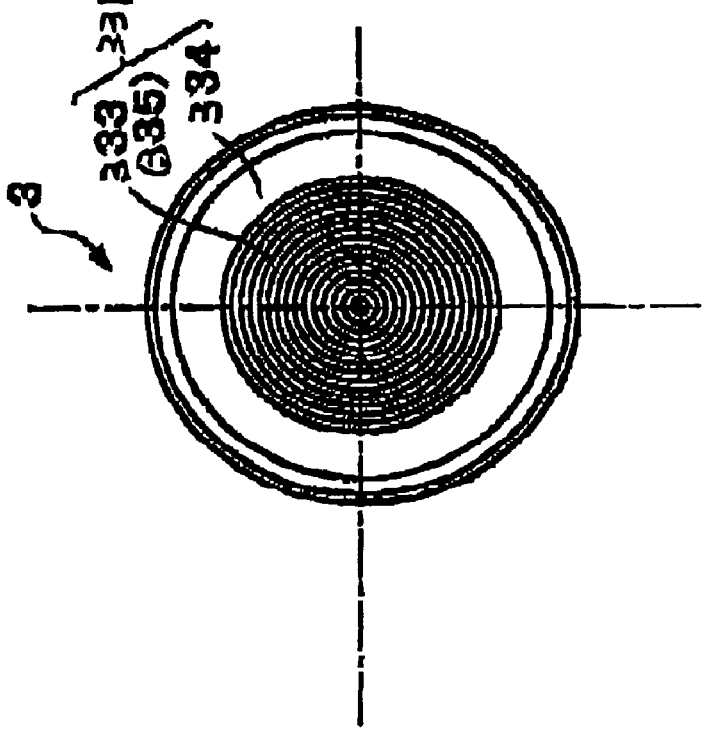

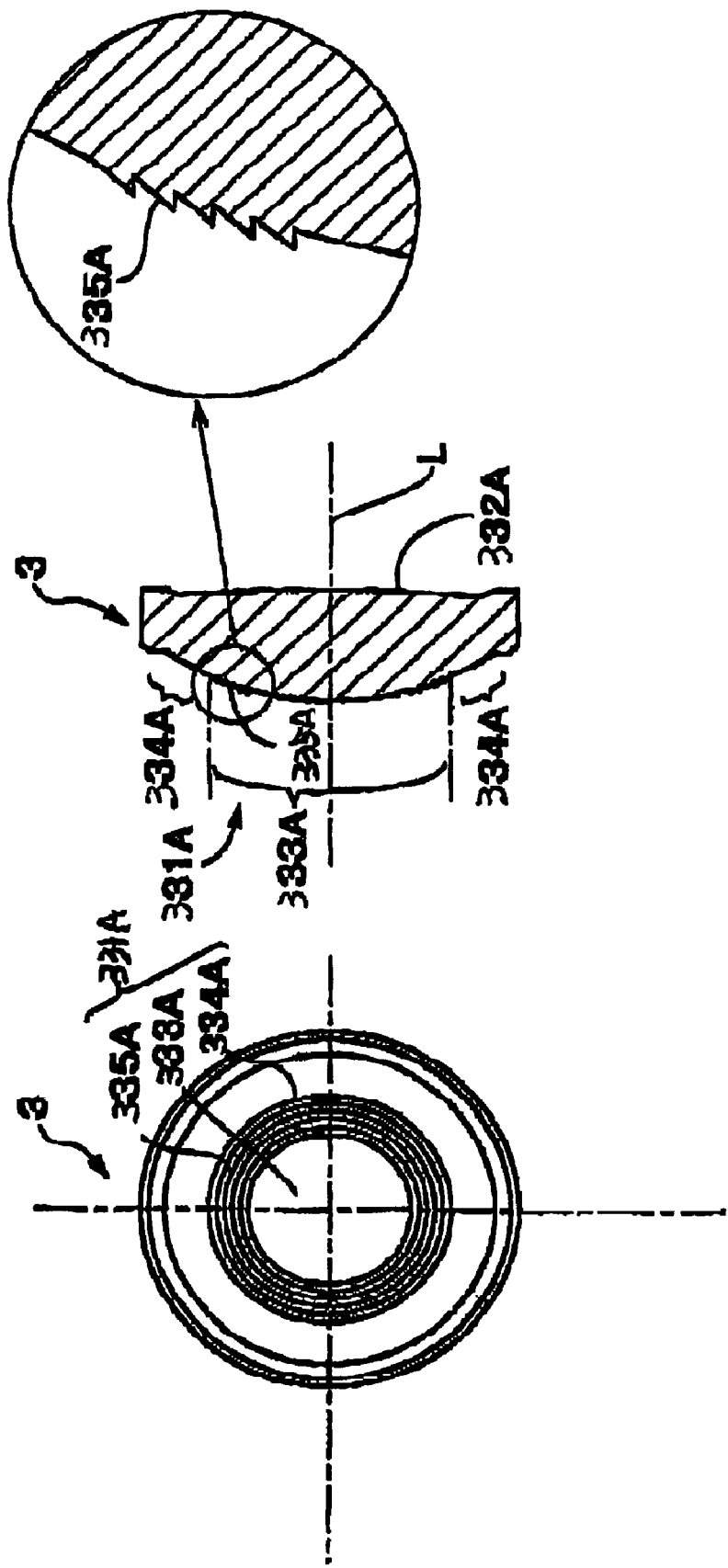

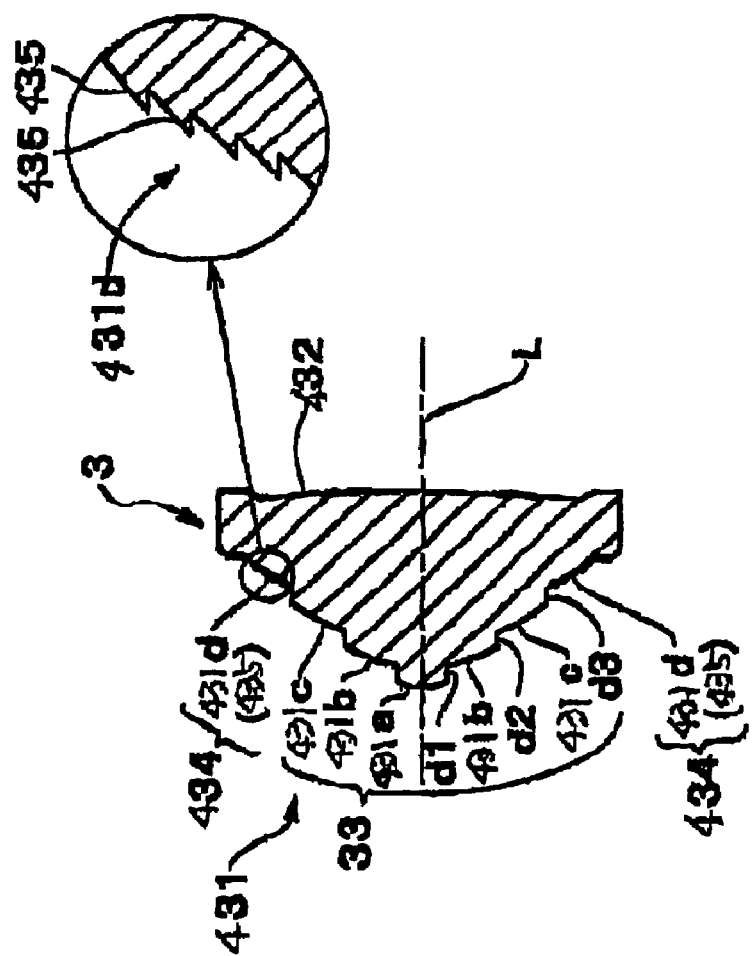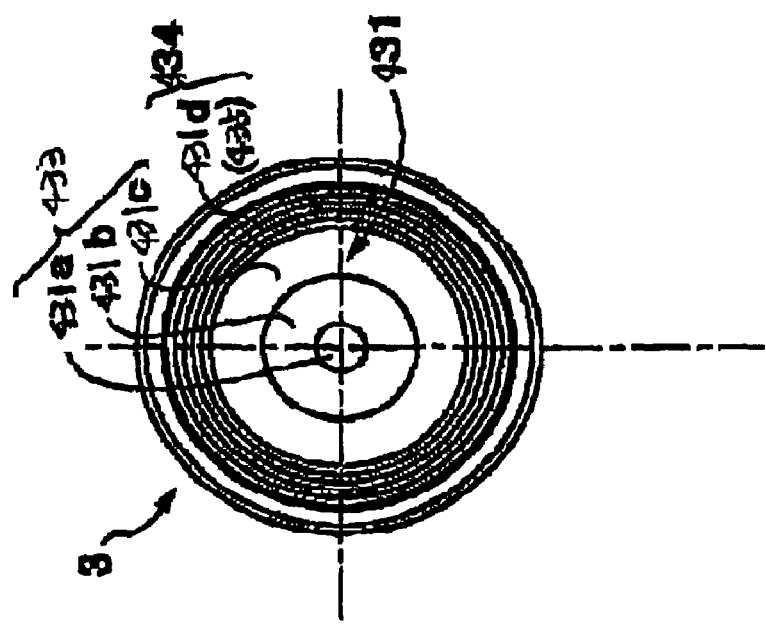

OPTICAL HEAD DEVICE AND OBJECTIVE LENS

BACKGROUND OF THE INVENTION

1. Field of the Invention

The present invention relates to an optical head device for protecting and recording data on optical recording media such as compact disks (CDs) and digital video disks (DVDs) that have different substrate thickness by using laser beams having different wavelengths. Moreover, the present invention relates to objective lenses that are suitable for such optical head device.

2. Related Background Art

Optical recording media having transparent substrates for protecting recording surfaces with different thickness and different recording density such as CDs and DVDs are known. For example, each CD is provided with a transparent substrate for protecting its recording surface whose thickness is 1.2 mm, while each DVD is provided with a transparent substrate that is thinner than that of the CD, which is 0.6 mm, and has a higher recording density than that of the CD.

There have been proposed optical head devices that record and reproduce information on optical recording media, which use, in order to make the optical head devices smaller and more compact, a single objective lens to focus laser beams on recording surfaces of CDs and DVDs.

Such an objective lens may have a lens surface having a single refractive power that is provided with a minute diffraction grating. An incident beam is diffracted by the diffraction grating, such that a plurality of focal points are formed at different positions along an optical axis with diffracted beams of multiple orders. Also, the diffraction property of the diffraction grating is designed such that high light converging efficiencies are attained at two focal points among the focal points formed with the multiple diffracted beams of multiple orders, and one of the diffracted beams forming these two focal points on a high order side is focused at a position with a shorter focal length.

An optical head device using the objective lens described above diffracts a laser beam with a wavelength of 650 nm into two diffracted beams, for example, a first order diffracted beam and a second order diffracted beam such that the first order diffracted beam can be focused at a first focal point on the recording surface of a CD, and the second order diffracted beam can be focused at a second focal point with a shorter focal distance on the recording surface of a DVD.

However, since the objective lens described above is designed on the premise that a laser beam with a single wavelength is converged at two different focal points, this objective lens is not suitable for a two-wavelength light source type optical head device that uses laser beams with different wavelengths, such as an optical head device equipped with a light source for a laser beam with a wavelength of 780 nm to be used for reproducing and recording data on a compact disk recordable (CD-R) and a light source for a laser beam with a wavelength of 650 nm to be used for reproducing data on a DVD.

A two-wavelength light source typo optical head device may use an objective lens provided with a lens surface with three split faces that are concentric from an optical axis side to an outer circumferential side of the objective lens, i.e., a first split face of a circular shape, a second split face of a ring-shape and a third split face of a ring-shape. Also, the second split face is formed with a diffraction grating.

The objective lens described above converges a beam that passed the first split face and a $0^{th}$ order beam that passed the diffraction grating of the second split face at a first focal point for reproducing and recording data on a CD-R in the case of the laser beam with a wavelength of 780 nm, and converges a beam that passed the first and third split faces and a $1^{st}$ order diffracted light that has been diffracted by the second split face at a second focal point for reproducing data on a DVD. For this reason, the first split face through the second split face are used as an aperture for CD-Rs, and the first split face through the third split face are used as an aperture for DVDs.

However, despite the fact that two types of media having different substrate thickness are subject to the objective lens described above, the lens surface, which is a basis of the objective lens, is split into three faces. This forces a severe burden on designing the diffractive grating, and invites deterioration of the light utility efficiency.

SUMMARY OF THE INVENTION

The present invention relates to an objective lens for an optical head device with a relatively simple Structure that is capable of forming a beam spot of a first laser beam on a recording surface of a first optical recording medium and a beam spot of a second laser beam having a different wavelength on a recording surface of a second optical recording medium, and to provide an optical head device equipped with such an objective lens.

To solve the problems discussed above, an embodiment of the present invention pertains to an optical head device that converges first and second laser beams having different wavelengths on recording surfaces of first and second optical recording media through a single light converging optical system for recording or reproducing data on the recording surfaces, wherein a refracting surface of an objective lens composing the light converging optical system may be divided into two regions, i.e., a central refracting surface region with an optical axis thereof being as a center and an outer circumferential refracting surface region that surrounds an outer circumference of the central refracting surface region wherein a diffraction grating is formed generally entirely over the central refracting surface region. When recording or reproducing data on the first optical recording medium using the first laser beam, a beam spot is formed with a diffracted beam obtained by the central refracting surface region. In the meantime, when recording or reproducing data on the second optical recording medium using the second laser beam, a beam spot is formed with a beam that passed the outer circumferential refracting surface region and a diffracted beam obtained by the central refracting surface region.

In accordance with the present invention, a refracting surface of the objective lens may be provided with two split refracting surface regions, wherein one of the refracting surface regions is designed such that a beam spot of the first laser beam is formed on a recording surface of the first optical recording medium, the other of the refracting surface regions is designed such that a beam spot of the second laser beam is formed on a recording surface of the second optical recording medium. Accordingly, designing of the refractive surfaces becomes easy.

Also, the refractive grating may be designed to be optimum for refracting the second laser beam toward a beam spot forming position. Accordingly, the diffraction grating can be readily designed.

In addition, due to the fact that predetermined portions of the first and second laser beams that are important to form beam spots are passed through the objective lens without being diffracted, the use efficiency of the laser beams can be improved.

A second diffraction grating that diffracts the first laser beam so as not to converge on the beam spot forming position may be formed over the entire area of the outer circumferential refracting surface region. By so doing, unnecessary beam components on the outer circumferential portions of the first laser beam can be eliminated without using an aperture stop.

Also, an outer circumferential diffraction grating may be formed over the entire area of the outer circumferential refracting surface region, and a beam spot can be formed with a $1^{st}$ order diffracted beam obtained by the central refracting surface region and a $1^{st}$ order diffracted beam obtained by the outer circumferential diffraction grating when the second laser beam is used.

Further, the outer circumferential refracting surface region may be formed to have a refractive power that is generally suitable for the second laser beam to form a beam spot on the second optical recording medium, and an outer circumferential diffraction grating may be formed over the entire area of the outer circumferential refracting surface region. By so doing, when the second laser beam is used, a beam spot can be formed with a $1^{st}$ order diffracted beam obtained by the central refracting surface region and a $0^{th}$ order diffracted beam obtained by the outer circumferential refracting surface region.

Also, the central diffraction grating formed in the central refracting surface region may be used to form beam spots on recording surface of the respective first and second optical recording media with diffracted beams of the same order of the first and second laser beams, i.e., the $1^{st}$ diffracted beams, by using differences of their wavelengths. In this case, the diffraction grating may be designed such that the diffraction efficiency of the $1^{st}$ order diffracted beam becomes maximum, thereby improving the use efficiency of the laser beams.

Further, when the outer circumferential diffraction grating is formed, the first laser beam may be diffracted such that unnecessary light components on the outer circumferential portion of the first laser beam would not be converged on a beam spot forming position on a recording surface of the first optical recording medium. By so doing, unnecessary light components can be eliminated without using an aperture stop.

In accordance with another embodiment of the present invention, a refracting surface of an objective lens composing the light converging optical system is divided into two regions, i.e., a central refracting surface region with an optical axis thereof being as a center and an outer circumferential refracting surface region that surrounds an outer circumference of the central refracting surface region, wherein a diffraction grating is formed generally entirely over the outer circumferential refracting surface region. Further, the central refracting surface region may be formed to have a refractive power that is generally suitable for the first laser beam to form a beam spot on a recording surface of the first optical recording medium, and the outer circumferential refracting surface region may be formed to have a refractive power that is generally suitable for the second laser beam to form a beam spot on a recording surface of the second optical recording medium. Also, the diffraction property of the diffraction grating may be set such that beam components of the first laser beam that pass the outer circumferential refracting surface region are not converged on a beam spot forming position on a recording surface of the first optical recording medium.

Also, in accordance with the present invention, a refracting surface of an objective lens composing the light converging optical system may be equipped with a refractive power that is generally suitable for the second laser beam to form a beam spot on a recording surface of the second optical recording medium, and a diffraction grating may be formed over the entire area of a central region of the refracting surface of the objective lens corresponding to an aperture number set for the first optical recording medium, and the diffraction property of the diffraction grating may be set such that a beam spot is formed on a recording surface of the first optical recording medium with a diffracted beam component of a predetermined order among diffracted beam components of the first laser beam obtained by the central region.

In this case, when the first laser beam is incident upon the objective lens, a beam spot is formed on a recording surface of the first optical recording medium with a diffracted beam component of a predetermined order of the first lager beam diffracted by the diffraction grating formed in the central region of the refracting surface of the objective lens. In the meantime, when the second laser beam is incident on the objective lens, a beam spot is formed on a recording surface of the second optical recording medium with a $0^{th}$ order diffracted beam component of the second laser beam obtained by the central region of the refracting surface of the objective lens where the refractive grating is formed and a beam component of the second laser beam that passed the lens' refracting surface other than the central region.

The refracting surface of the objective lens described above is provided with a refractive power that is generally suitable for the second optical recording medium having a thinner substrate. Accordingly, the use efficiency of the second laser beam that is used for reproducing data on the second efficiency recording medium can be improved. Also, due to the fact that a refractive grating is formed in the central region of the lens' refracting surface that is used for reproducing data on the first optical recording medium, the aberration of the light spot formed on a recording surface of the first optical recording medium can be suppressed.

Instead of forming the diffraction grating over the entire area of the central region, a refractive grating in a ring-band shape may be formed only in an outer circumference portion of the central region. In other words, due to the fact that a region in proximity to the optical axis of the lens' refracting surface that is designed to be suitable for the second optical recording medium does not have any practical problem even when it is used as is for the first optical recording medium, the diffraction grating may be formed only in an outer circumference portion of the central region of the lens' refracting surface and the aberration may be suppressed so as not to cause any problem in reproducing data on the first optical recording medium.

As a result, the use efficiency of the first laser beam can be improved so much as the diffraction is not used. Also, since the structure of the refracting surface of the lens can be further simplified, metal molds can be more readily manufactured, and the transfer property upon forming the lens with the molds is improved.

Furthermore, in accordance with another embodiment of the present invention, a refracting surface of an objective lens composing a light converging optical system may be composed of a plurality of ring-band shape refracting surfaces concentrically arranged about an optical a thereof, and step differences are formed in a direction of the optical axis at boundaries of the plurality of ring-band shape refracting surfaces. Each of the plurality of ring-band shape refracting surfaces is formed to have a refractive power that is generally suitable for the second laser beam to form a beam spot on a recording surface of the second optical recording medium; those of the step differences of the ring-band shape refracting surfaces formed in a central region of the refracting surface of the objective lens according to an aperture number set for the first optical recording medium are set such that a beam spot of the first laser beam can be formed on a recording surface of the first optical recording medium; and a diffraction grating is formed on those the ring-band shape refracting surfaces formed in an outer circumference region that surrounds an outer circumference of the central region of the refracting surface of the objective lens, wherein the diffraction property of the diffraction grating is set such that a beam component of the first laser beam that passed the outer circumference region is not converged on a beam spot forming position on a recording surface of the first optical recording medium.

In the above embodiment, when the step difference and a wavelength $\lambda 2$ of the second laser beam have a relation that is generally defined by $A\lambda 2/(n-1)$ (where A is a positive integer, and n is an index of refraction of the ring-band shape refracting surface), a beam spot can be formed with the first laser beam on a recording surface of the first optical recording medium without the second laser beam being affected by the stop differences. Here, when the step difference is set to meet $\lambda 2/(n-1)$ by setting A at a value of 1, generation of unnecessary light by the step differences can be suppressed.

The objective lens described above can form beam spots with the first and second laser beams by refraction on recording surfaces of the respective optical recording media without using diffraction. Accordingly, the light use efficiency of the first laser beam for the first optical recording medium and the light use efficiency of the second laser beam for the second optical recording medium can be increased.

Also, since the only requirements are to design the outer circumference region of the refracting surface such that the outer circumference region transmits the second laser beam with almost no refraction, and the first laser beam passing the outer circumference region is not converged on a beam spot forming position, the degree of freedom in optical design of the outer circumference region is great and metal molds can be readily manufactured.

Further, the present invention pertains to an objective lens for each of the optical head devices described above, and the objective lens is equipped with any one of the lens refracting surfaces described above.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIGS. 4(*a*), (*b*), (*c*) and (*d*) are respectively a plan view, a cross-sectional view and partially enlarged cross-sectional views of a modified example of the first composition of the objective lens.

FIGS. 5(*a*), (*b*) and (*c*) are respectively a plan view, a cross-sectional view and a partially enlarged cross-sectional view of a second composition of the objective lens indicated in FIG. 1.

FIGS. 7(*a*), (*b*), (*c*) and (*d*) are respectively a plan view, a cross-sectional view and partially enlarged cross-sectional views of a modified example of the second composition of the objective lens.

FIGS. 8(*a*), (*b*) and (*c*) are respectively a plan view, a cross-sectional view and a partially enlarged cross-sectional view of a third composition of the objective lens indicated in FIG. 1.

FIGS. 10(*a*), (*b*) and (*a*) are respectively a plan view, a cross-sectional view and a partially enlarged cross-sectional view of a fourth composition of the objective lens indicated in FIG. 1.

FIGS. 12(*a*), (*b*), (*c*) and (*d*) are respectively a plan view, a cross-sectional view and partially enlarged cross-sectional views of a modified example of the fourth composition of the objective lens.

FIGS. 13(*a*), (*b*) and (*c*) are respectively a plan view, a cross-sectional view and a partially enlarged cross-sectional view of a fifth composition of the objective lens indicated in FIG. 1.

DESCRIPTION OF PREFERRED EMBODIMENTS

Examples of optical head devices equipped with objective lenses in accordance with embodiments of the present invention are described below with reference to the accompanying drawings.

(Overall Composition)

Figure 1:
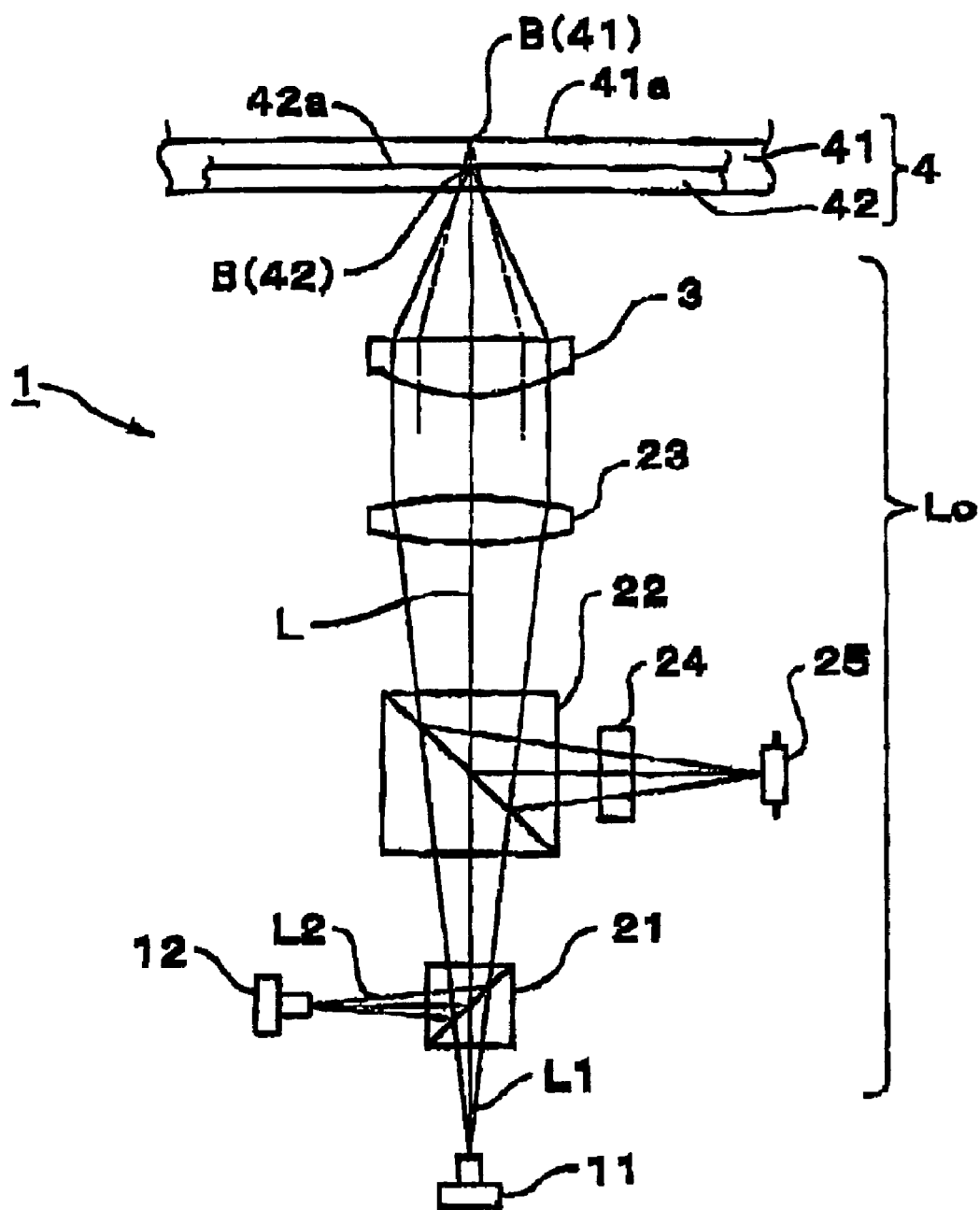
FIG. 1 schematically shows an optical system of an optical head device in accordance with the present invention.

FIG. 1 schematically shows a structure example of an optical head device 1 illustrated based on its optical system in accordance with the present invention. The optical head device 1 of the present example can reproduce and record information on an optical recording medium 4 in multiple kinds that are different in substrate thickness and recording density, such as a CD, CD-R, DVD or the like. For this reason, the optical head device 1 is equipped with two laser beam sources, i.e., a first laser beam source 11 and a second laser beam source 12. The first laser beam source 11 emits a first laser beam L1 with a central wavelength of 780 nm for reproducing information on a CD-R, for example, and the second laser beam source 12 emits a second laser beam L2 with a wavelength of 650 nm that is used for reproducing information on a DVD) for example. Each of the laser beams is conducted to the optical recording medium 4 through a common light converging optical system Lo, and a returning light of each of the laser beams reflected on the optical recording medium 4 is conducted to a common light receiving element 25.

The light converging optical system Lo includes a first beam splitter 21 that linearly advances the first laser beam L1 and reflects the second laser beam L2 to make these two beams to coincide on a system optical axis L (an optical axis of an objective lens), a second beam splitter 22 that passes the laser beams L1 and L2 that advance along the system optical axis L, a collimate lens 23 that collimates the laser beams L1 and L2 that have passed the second beam splitter 22, and an objective lens 3 that forms beam spots of the laser beams L1 and L2 emitted from the collimate lens 23 on a recording surface of the optical recording medium 4. Beam spots are formed on recording surface of different optical recording media 4, for example, on a recording surface 42a of a DVD 42 and a recording surface 41a of a CD or a CD-R 41. The objective lens 3 forms a beam spot with the first laser beam L1 on the recording surface 41a of the CD-R 41, and a beam spot with the second laser beam L2 on the recording surface 42a of the DVD 42.

Also, the light converging optical system Lo includes a grating 24 that conducts return lights of the first and second laser beams, which have been reflected on the optical recording medium 4, and reflected by the second beam splitter 22, to the common light receiving element 25.

In the optical head device 1 having the structure described above, when, for example, reproducing information on the CD-R 41 as the optical recording medium 4, the first laser beam source 11 emits the first laser beam L1 with a wavelength of 780 nm. The first laser beam L1 is conducted along the light converging optical system Lo to the objective lens 3, and forms a beam spot B (41) on the recording surface 41a of the CD-R 41. A return light of the first laser beam L1 that is reflected on the recording surface 41a of the CD-R 41 is converged on the common light receiving element 25 through the second beam splitter 22. Signals detected by the common light receiving element 25 are used to reproduce the information recorded on the CD-R 41.

In the meantime, when, for example, reproducing information on the DVD 42 as the optical recording medium 4, the second laser beam source 12 emits the second laser beam L2 with a wavelength of 650 nm. The second laser beam L2 is also conducted in the light converging optical system Lo to the objective lens 3, and forms a beam spot B (42) on the recording surface 42a of the DVD 42. A return light of the second laser beam L2 that is reflected on the recording surface 42a of the DVD 42 is converged on the common light receiving element 25 through the second beam splitter 22. Signals detected by the common light receiving element 25 are used to reproduce the information recorded on the DVD 42.

(First Composition of Objective Lens)

Figure 2:
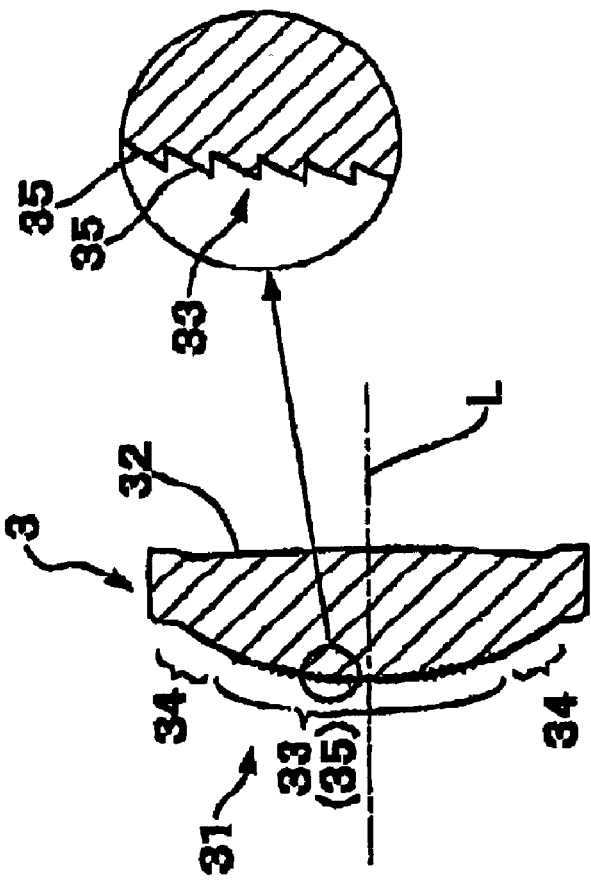
FIGS. 2(*a*), (*b*) and (*c*) are respectively a plan view, a cross-sectional view and a partially enlarged cross-sectional view of a first composition of an objective lens indicated in FIG. 1.
Figure 3:
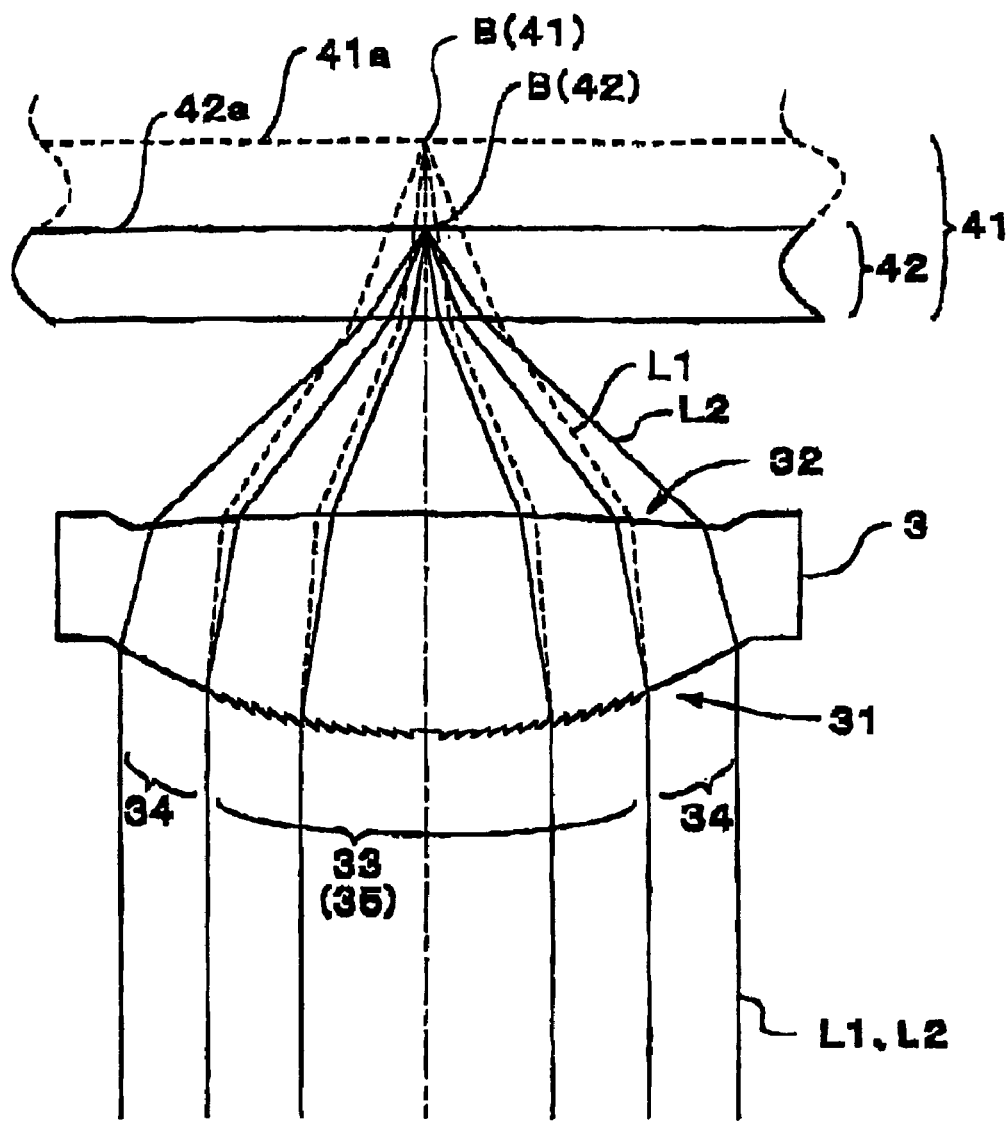
FIG. 3 is an illustration to describe converging states of first and second laser beams by the objective lens indicated in FIGS. 2(*a*), (*b*) and (*c*).

Next, referring to FIGS. 2 and 3, a first composition of the objective lens 3 of the present invention will be described. FIGS. 2(a), (b) and (c) are respectively a plan view, a cross-sectional view and a partially enlarged cross-sectional view of the objective lens 3. FIG. 3 is an illustration to describe converging states of laser beams with different wavelengths formed by the objective lens 3.

The objective lens 3 of the instant example is a convex lens equipped with a light incident side refracting surface 31 having a positive refractive power upon which the laser beams L1 and L2 omitted from the first laser beam source 11 and the second laser beam source 12 are incident, and a light emitting side refracting surface 32 that emits the laser beams toward the optical recording medium 4. The light incident side refracting space 31 is divided into two regions, i.e., a central refracting surface region 33 in a circular shape including the optical axis L concentrically arranged about the optical axis L as a center and an outer circumferential refracting surface region 34 that surrounds an outer circumference of the central refracting surface region 33. Also, a diffraction grating 35 is formed over the entire area of the central refracting surface region 33.

As indicated by dotted lines in FIG. 3, the central refracting surface region 33 of the objective lens 3 has a refractive power that forms on the recording surface 41a of the CD-R 41 a beam spot B (41) of the first laser beam L1 emitted from the first laser beam source 11. The first diffraction grating 35 formed in the central refracting surface region 33 is equipped with a diffraction property that forms on the recording surface 42a of the DVD 42 a beam spot B (42) with a $1^{st}$ order diffracted beam of the second lager beam L2 that passes the instant region. In the meantime, the outer circumferential refracting surface region 34 has a refractive power that forms on the recording surface 42a of the DVD 42 a beam spot B (42) of beam portions of the second laser beam L2 that pass outside the central refracting surface region 33.

With the optical head device 1 equipped with the objective lens 3 having the structure described above, when reproducing information on the CD-R 41, the first laser beam source 11 is driven to emit the first laser beam L1. Among beam components of the first laser beam L1 that pass the central refracting surface region 33 of the objective lens 3, a $0^{th}$ order diffracted beam component that is not affected by the diffraction action of the diffraction grating 35 formed in the instant region forms a beam spot B (41) on the recording surface 41a of the CD-R 41. Beam components of the first laser beam L1 that pass the outer circumferential refracting surface region 34 of the objective lens 3 are light that is not required for data reproduction and thus are not used.

When reproducing information on the DVD 42, the second laser beam source 12 is driven to emit the second laser beam L2. Among beam components of the second laser beam L2 that pass the central refracting surface region 33 of the objective lens 3, a $1^{st}$ order diffracted beam component that is diffracted and generated by the diffraction grating 35 armed in the instant region and beam components that pass the outer circumferential refracting surface region 34 of the objective lens 3 form a beam spot B (42) on the recording surface 42a of the DVD 42.

(Effects of the First Composition Example)

The objective lens 3 of the first composition has a refracting surface that is composed of two split surfaces, and thus the designing and manufacturing of the refracting surface are easier compared to the conventional objective lens with three split surfaces. Also, the diffraction grating can be designed to be optimum only for diffracting the second laser beam, the design of the diffraction grating becomes easier.

In addition, since portions of the first and second laser beams that are important for forming beam spots are passed through the objective lens without being diffracted, the use efficiency of the laser beams can be improved.

(Modified Example of the First Composition of the Objective Lens)

Upon recording or reproducing information on a CD-R, the first laser beam component that passes the outer circumferential refracting surface region 34 is an unnecessary light that is not required for reproducing information. To securely eliminate the unnecessary light, a refractive grating may also be formed on the surface of the outer circumferential refracting surface region such that beam components of the first laser beam that pass the outer circumferential refracting surface region are diffracted by the diffraction grating in directions different from the beam spot forming position.

FIG. 4(a) is a plan view of an example of an objective lens 3A in which a diffraction grating is also formed in its outer circumferential refracting surface region. FIG. 4(b) is a cross-sectional view of the objective lens, and FIGS. 4(c) and (d) are partially enlarged cross-sectional views of the objective lens. As shown in these figures, the objective lens 3A is a convex lens equipped with a light incident side refracting surface 31A having a positive refractive power upon which the laser beams L1 and L2 emitted from the first laser beam source 11 and the second laser beam source 12 are incident, and a light emitting side refracting surface 32A that emits the laser beams toward the optical recording medium.

The light incident side refracting surface 31A is divided into two regions, i.e., a central refracting surface region 33A in a circular shape including the optical axis L and an outer circumferential refracting surface region 34A in a ring shape that concentrically surrounds the central refracting surface region 33A. Also, the central refracting surface region 33A is a refracting surface that forms a beam spot of the first laser beam L1 on a recording surface of a CD-R, and a first diffraction grating 35A is formed over the entire area of the central refracting surface region 33A. Further, the outer circumferential refracting surface region 34A is a refracting surface that forms a beam spot of the second laser beam L2 on a recording surface of a DVD, and a second diffraction grating 36 is formed over the entire over of the outer circumferential refracting surface region 34A.

Accordingly, among beam components of the first laser beam L1 that is emitted at the time of recording or reproducing information on a CD-R, those of the beam components that pass the central refracting surface region 33A form a beam stop on a recording surface of the CD-R. In other words, the beam spot is formed on the recording surface of the CD-R with a $0^{th}$ order beam component, among the beam components of the first laser beam L1, that is refracted by the central refracting surface region 33A and passes as is without being affected by the diffraction action of the first diffraction grating 35A formed therein.

Among the first laser beam L1, those of the beam components that pass the outer circumferential refracting surface region 34A are unnecessary light components that do not contribute to recording or reproducing information, and therefore are affected by the diffraction action of the second diffraction grating 36 armed in the outer circumferential refracting surface region 34A to be diffracted so as not to converge on the beam spot forming position.

Among beam components of the second laser beam L2 emitted upon reproducing information on a DVD, a $1^{st}$ order diffracted beam that is affected and generated by the diffraction action of the first diffraction grating 35A formed in the central refracting surface region 33A forms a beam spot on a recording surface of the DVD. Accordingly, a beam spot is formed on the recording surface of the DVD with the $1^{st}$ order beam and a $0^{th}$ order beam component, among beam components of the second laser beam L2 that pass the outer circumferential refracting surface region 34A, that is affected by the refracting action of the refracting surface region but not affected by the diffraction action of the second diffraction grating 36.

(Second Composition of Objective Lens)

Figure 6:
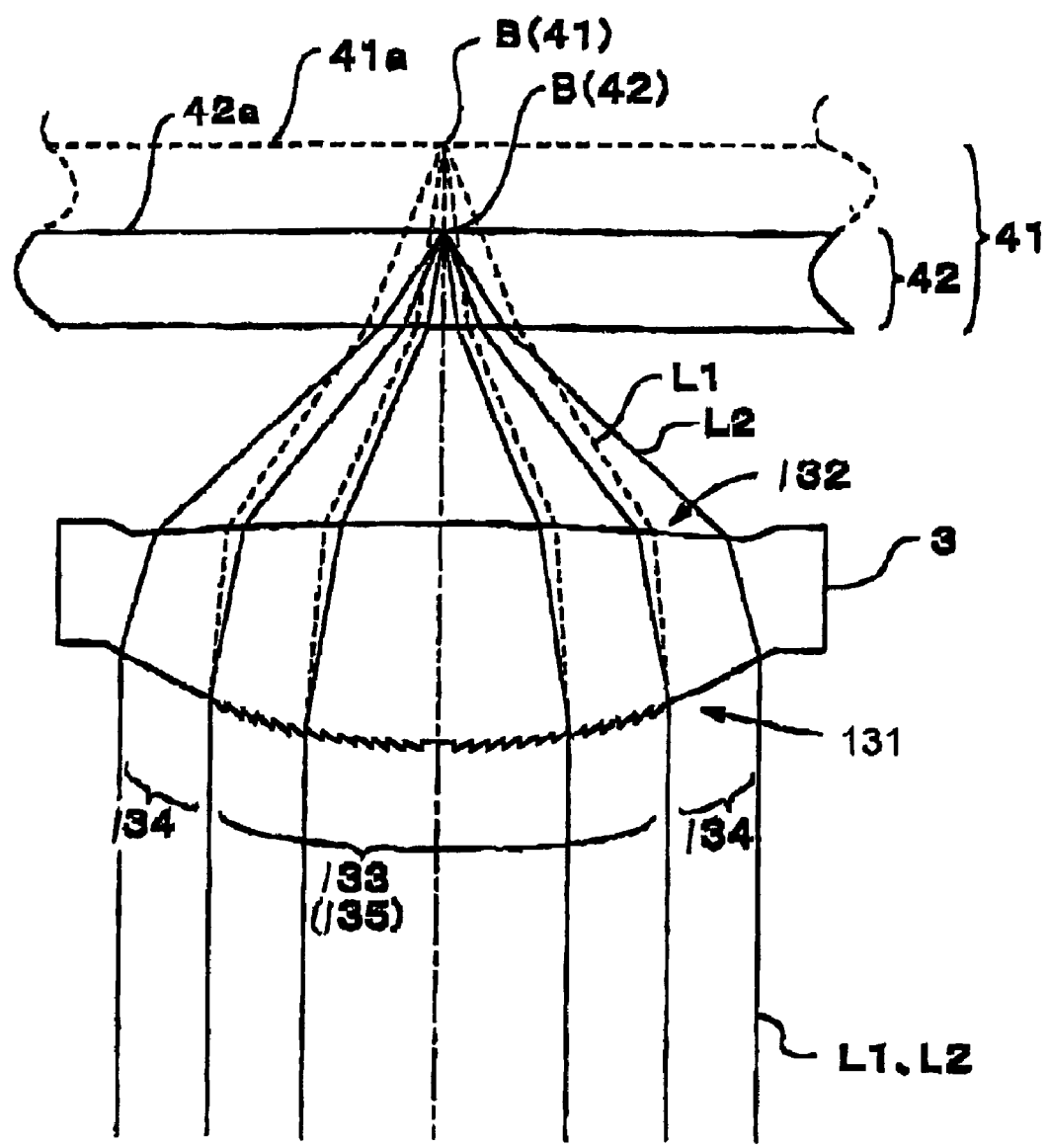
FIG. 6 is an illustration to describe converging states of first and second laser beams by the objective lens indicated in FIGS. 5(*a*), (*b*) and (*c*).

Next, referring to FIGS. 5 and 6, a second composition of the objective lens 3 of the present invention will be described. The objective lens 3 shown in FIGS. 5(a), 5(b) and 5(c) includes a central refracting surface region 133 and an outer circumferential refracting surface region 134. The central refracting surface region 133 is a refracting surface region that has a refractive power different from a refractive power of the outer circumferential refracting surface region 134. A central diffraction grating 135 is formed in the central refracting surface region 133, and has a diffraction property that forms a beam spot on a recording surface of a CD-R with a $1^{st}$ order diffracted beam of the first laser beam L1 that passes the central refracting surface region 133. In addition, the central diffraction grating 135 has a diffraction property that forms a beam spot on a recording surface of a DVD 42 with a $1^{st}$ order diffracted beam of the second laser beam L2 that passes the central refracting surface region 133.

In contrast, the outer circumferential refracting surface region 134 of the objective lens 3 has a refractive power that forms on a recording surface of the DVD 42 a beam spot with beam portions of the second laser beam L2 that pass the outer circumferential refracting surface region 134.

With the optical head device 1 equipped with the objective lens 3 having the structure described above, when reproducing information on the CD-R 41, the first laser beam source 11 is driven to emit a first laser beam L1. Among beam components of the first laser beam L1 that pass the central refracting surface region 133 of the objective lens 3, a $1^{st}$ order diffracted beam component that is diffracted by the central diffraction grating 135 formed in the instant region forms a beam spot B (41) on the recording surface 41a of the CD-R 41, as indicted by dotted lines in FIG. 6. Beam components of the first laser beam L1 that pass the outer circumferential refracting surface region 134 of the objective lens 3 are light that is not required for data reproduction and thus are not used.

When reproducing information on a DVD 42, the second laser beam source 12 is driven to emit a second laser beam L2. As indicated by solid lines in FIG. 6, a $1^{st}$ order diffracted beam that is diffracted and generated by the central diffraction grating 135 among beam components of the second laser beam L2 that pass the central refracting surface region 133 of the objective lens 3, and beam components that pass the outer circumferential refracting surface region 134 of the objective lens 3 form a beam spot B (42) on a recording surface of the DVD 42.

(Effects of the Second Composition Example)

The objective lens 3 of the second composition has a refracting surface that is composed of two split surfaces, and thus the designing and manufacturing of the refracting surface are easier compared to the conventional objective lens with three split surfaces. Also, by using the differences in the wavelengths, beam spots are formed on recording surfaces of the CD-R 41 and DVD 42 with the $1^{st}$ order diffracted beam components of the respective first and second laser beams L1 and L2 that are diffracted by the central diffraction grating 135. Therefore, by designing the central diffraction grating 135 such that the let order diffracted beams have an optimum diffraction efficiency, the use efficiency of the laser beams can be improved.

(Modified Example of the Second Composition of the Objective Lens)

In the case of the objective lens 3 described above, the refractive power of the outer circumferential refracting surface region 134 is set to an appropriate value to form a beam spot on a recording surface of the DVD 42 with beam components of the second laser beam that pass the outer circumferential refracting surface region 134. In addition, a diffraction grating may also be formed in the outer circumferential refracting surface region 134 such that a beam spot can be formed on a recording surface of the DVD 42 with diffracted beam components of the second laser beam generated by the diffraction grating.

FIG. 7(a) is a plan view of an example of the objective lens 3 in which a diffraction grating is also formed in its outer circumferential refracting surface region, FIG. 7(b) is a cross-sectional view of the objective lens 3, and FIGS. 7(c) and (d) are partially enlarged cross-sectional views of the objective lens 3. As shown in these figures, the objective lens 3 is a convex lens equipped with a light incident side refracting surface 131A having a positive refractive power upon which the laser beams L1 and L2 are incident, and a light emitting side refracting surface 132A that emits the laser beams toward an optical recording medium.

The light incident side refracting surface 131A is divided into two regions, i.e., a central refracting surface region 133A in a circular shape including the optical axis L and an outer circumferential refracting surface region 134A in a ring shape that concentrically surrounds the central refracting surface region 133A. Also, a central diffraction grating 135A is formed over the entire area of the central refracting surface region 133A. Further, an outer circumferential diffraction grating 136 is also formed over the entire area of the outer circumferential refracting surface region 134A.

The objective lens 3 forms a beam spot on a recording surface 41a of the CD-R 41 with beam components that pass the central refracting surface region 133A among beam components of the first laser beam L1 that is emitted at the time of recording or reproducing information on the CD-R 41. More specifically, a beam spot B (41) is formed on the recording surface of the CD-R 41 with a $1^{st}$ order diffracted beam component, among the beam components of the first laser beam L1, that is affected by the diffraction action of the central diffraction grating 135A.

Among the first laser beam L1, those of the beam components that pass the outer circumferential refracting surface region 134A are unnecessary light components that do not contribute to recording or reproducing information, and therefore in the present example are affected by the diffraction action of the outer circumferential diffraction grating 136 formed in the outer circumferential refracting surface region 134A to be diffracted so as not to converge on a beam spot forming position on the recording surface of the CD-R 41.

The objective lens 3 of the present embodiment forms a beam spot on a recording surface 42a of a DVD 42 with a second laser beam L2 upon reproducing information on the DVD 42. A beam spot is formed on the recording surface 42a of the DVD 42 with a $1^{st}$ order diffracted beam component, among beam components of the second laser beam L2 that pass the central refracting surface region 133A, that is diffracted and generated by the central diffraction grating 135A formed in the central refracting surface region 133A. In addition, a beam spot is also formed at the same location on the recording surface 42a of the DVD 42 with a $1^{st}$ order beam component, among beam components of the second laser beam L2 that pass the outer circumferential refracting surface region 134A, which is diffracted and generated by the diffraction action of the outer circumferential diffraction grating 136 formed in the outer circumferential refracting surface region 134A.

By the objective lens 3 having the composition described above, effects similar to those of the embodiments described above can be obtained. In addition, the objective lens 3 of the present example is also provided with the outer circumferential diffraction grating 136 formed in the outer circumferential refracting surface region 134. The outer circumferential in diffraction grating 136 diffracts unnecessary light components of the first laser beam L1 on the outer circumferential portion so as not to converge on a beam spot forming position on a recording surface of the CD-R 41. Therefore, unnecessary light can be securely eliminated without using an aperture stop.

(Third Composition of Objective Lens)

Next, referring to FIGS. 8 and 9, a third composition of an objective lens 3 of the present invention will be described. The objective lens 3 shown in FIGS. 8(a), 8(b) and 8(c) is a convex lens equipped with a light incident side refracting surface 231 having a positive refractive power and a light emitting side refracting surface 232. The light incident side refracting surface 231 and light emitting side refracting surface 232 as a lens refracting surface are divided into two regions, i.e., a central refracting surface region 233 in a circular shape including the optical axis L and concentrically arranged about the optical axis L as a center, and an outer circumferential refracting surface region 234 that circularly surrounds an outer circumference of the central refracting surface region 233. Also, a diffraction grating 235 is also formed over the entire area of the outer circumferential refracting surface region 234 in the light incident side refracting surface 231.

The central refracting surface region 233 of the objective lens 3 has a refractive power that forms a beam spot B (41) on a recording surface of a CD-R 41 with beam components of the first laser beam L1 that pass the central refracting surface region 233.

The outer circumferential refracting surface region 234 has a refractive power that forms a beam spot B (42) on a recording surface of a DVD 42 with beam components of the second laser beam L2 that pass the outer circumferential refracting surface region 234. Also, the diffraction property of the diffraction grating 235 formed in the outer circumferential refracting surface region 234 is set such that the first laser beam L1 is not converged on a beam spot forming position on a recording surface of the CD-R 41.

Figure 9:
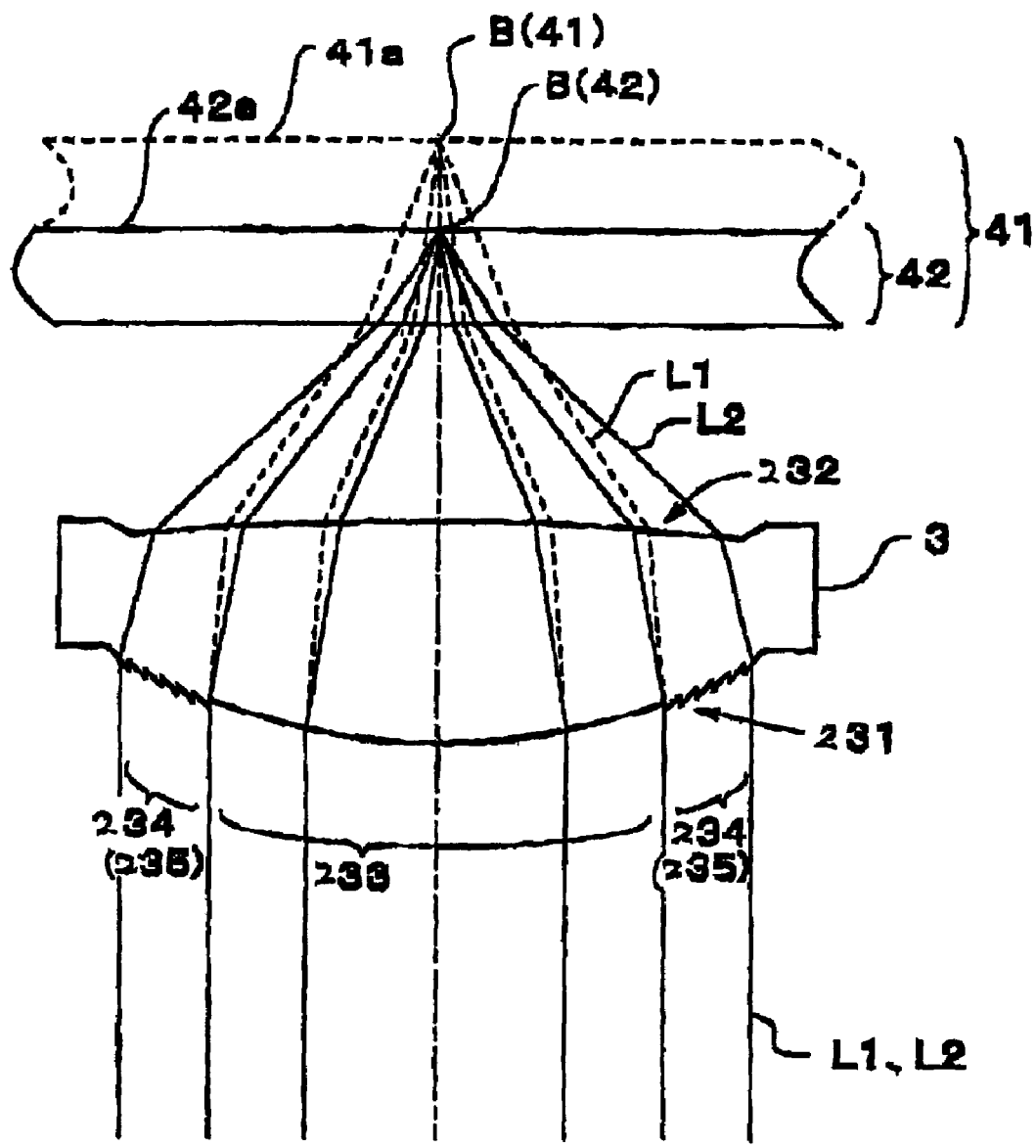
FIG. 9 is an illustration to describe converging states of first and second laser beams by the objective lens indicated in FIGS. 8(*a*), (*b*) and (*c*).

Upon reproducing information on a CD-R 41 with the optical head device 1 equipped with the objective lens 3 having the composition described above, among beam components of the first laser beam L1, those that pass the central refracting surface region 233 of the objective lens 3 form a beam spot B (41) on a recording surface of the CD-R 41 by the refractive power of the central refracting surface region 233, as indicated by dotted lines in FIG. 9.

Beam components of the first laser beam L1 that pass the outer circumferential refracting surface region 234 of the objective lens 3 are affected by the diffraction action of the diffraction grating 235 formed in the outer circumferential refracting surface region 234 and do not converge on the beam spot B (41).

Upon reproducing information on a DVD 42, a beam spot B (42) is formed on a recording surface of the DVD 42 with, among beam components of the second laser beam L2 that pass the outer circumferential refracting surface region 234, a $0^{th}$ order beam component that is formed by the refractive power of the outer circumferential refracting surface region 234 but not affected by the diffraction action of the diffraction grating 235, and beam components that pass the central refracting surface region 233 formed by the refractive power of the central refracting surface region 233.

In this manner, with the objective lens 3 in accordance with the embodiment described above, the first and second laser beams may be passed through the objective lens without being diffracted to form beam spots on recording surfaces of the respective optical recording media. As a result, the use efficiency of the laser beams can be improved.

(Fourth Composition of Objective Lens)

Next, referring to FIGS. 10 and 11, a fourth composition of an objective lens 3 of the present invention will be described. The objective lens 3 shown in FIGS. 10(a), 10(b) and 10(c) defines a lens refracting surface that is equipped with a light incident side refracting surface 131, and a light emitting side refracting surface 332. The lens refracting surface composed of the light incident side refracting surface 331 and the light emitting side refracting surface 332 is designed to have a refractive power that is generally suitable for the second laser beam L2 with a short wavelength to form a beam spot B (42) on a recording surface 42a of a DVD 42.

A diffraction grating 335 is formed over the entire area of a central region 333 of the light incident side refracting surface 331 corresponding to an aperture number (for example, an aperture number NA=0.5) defined for a CD-R 41 having a thick transparent substrate to diffract the first laser beam L1 to form a beam spot B (41) on a recording surface 41a of the CD-R 41. The diffraction property of the diffraction grating 335 is set such that a beam spot B (41) can be formed on the recording surface 41a of the CD-R 41 with a first diffracted beam component of the first laser beam L1.

Figure 11:
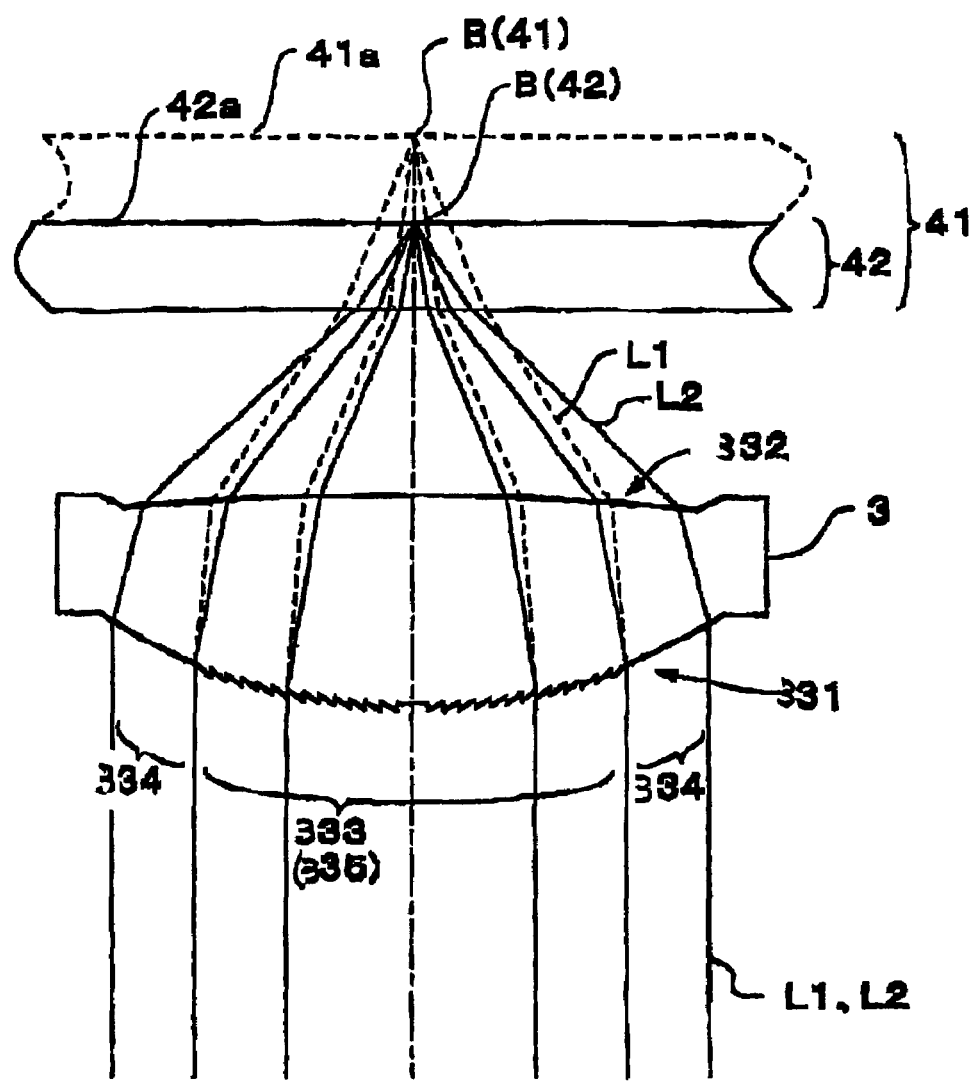
FIG. 11 is an illustration to describe converging states of first and second laser beams by the objective lens indicated in FIGS. 10(*a*), (*b*) and (*c*).

Upon reproducing information on a CD-R 41 with the optical head device 1 equipped with the objective lens 3 having the composition described above, among beam components of the first laser beam L1, those that are incident upon the central region 333 of the objective lens 3 are diffracted by the diffraction grating 335 formed in the central region 333, as indicated by dotted lines in FIG. 11. A $1^{st}$ diffracted beam component generated by the diffraction forms a beam spot B (41) on a recording surface 41a of the CD-R 41.

When reproducing information on a DVD 42, a second laser beam L2 is emitted, and as indicated by solid lines in FIG. 11, a beam spot B (42) is formed on a recording surface 42a of the DVD 42 with a $0^{th}$ order diffracted beam component of the second laser beam that is not affected by the diffraction action of the diffraction grating 335 formed in the central region 333, and beam components of the second laser beam L2 that pass an outer circumferential region 334.

(Effects of Fourth Composition of Objective Lens)

In the objective lens 3 of the optical head device having the fourth composition, its lens refracting surface is given a refractive power that is generally suitable for the DVD 42 with a thin substrate. As a result, the use efficiency of the second laser beam L2 that may be used for reproducing information on the DVD can be improved. Also, since the diffraction grating 335 is formed in the central region 333 of the lens refracting surface that may be used for recording and reproducing information on a CD-R 41 with a thick substrate, the aberration of a beam spot to be formed on the recording surface 41a of the CD-R 41 can be suppressed.

(Modified Example of Fourth Composition of Objective Lens)

In the objective lens 3 described above, the diffraction grating 335 is formed over the entire area of the central region 333 of the light incident aide refracting surface 331. Instead, as shown m FIG. 12, a diffraction grating may be formed in a ring-band shape only along an outer circumferential area of the central region 333. In other words, due to the fact that a region in proximity to the optical axis of the lens refracting surface that is designed to be suitable for a DVD 42 does not have any practical problem even when it is used as is for a CD-R 41, the diffraction grating may be formed only in an outer circumference portion of the central region of the lens refracting surface and the aberration may be suppressed so as not to cause any problem in recording and reproducing information on the CD-R 41.

FIG. 12(a) is a plan view of an example of an objective lens 3 in which a diffraction grating is formed only along an outer circumferential portion of the central region, FIG. 12(b) is a cross-sectional view of the objective lens 3, and FIG. 12(c) is a partially enlarged cross-sectional view of the objective lens 3. As shown in these figures, the objective lens 3 is equipped with a light incident side refracting surface 331A and a light emitting side refracting surface 332A as a lens refracting surface. The lens refracting surface is deigned to have a refractive power that is generally suitable for forming a beam spot B (42) on a recording surface 42a of a DVD 42 with a second laser beam L2 with a short wavelength.

Further, a diffraction grating 335A in the form of a ring-band is formed over an outer circumferential portion of the central region 333A of the light incident side refracting surface 331A corresponding to an aperture number (for example, an aperture number NA=0.5) defined for a CD-R 41. The diffraction grating 335A is provided to diffract the first laser beam L1 to form a beam spot on a recording surface 41a of the CD-R 41. The diffraction property of the diffraction grating 335A is set such that a beam spot can be formed on the recording surface 41a of the CD-R 41 with a first diffracted beam component among diffracted beam components of the first laser beam L1.

The objective lens 3 having the composition described above would create effects similar to those of the embodiment described above. In addition, the use efficiency of the first laser beam can be improved so much as the diffraction is not used. Also, since the structure of the refracting surface of the lens can be further simplified, metal mold can be more readily manufactured, and the transfer property upon forming the lens with the mold is improved.

(Fifth Composition of Objective Lens)

Next, referring to FIGS. 13 and 14, a fifth composition of an objective lens 3 of the present invention will be described. The objective lens 3 with the fifth composition is equipped with a light incident side refracting surface 431 and a light emitting side refracting surface 432 as a lens refracting surface.

The lens refracting surface is composed of a plurality of ring-band shape refracting surfaces concentrically formed about the lens optical axis L as a center. In the instant example, for example, the lens refracting surface is composed of a first ring-band shape (i.e., circular) refracting surface 431a including the optical axis L, a second ring-band shape refracting surface 431b that encircles an outer circumference of the first ring-band shape refracting surface 431a, a third ring-band shape refracting surface 431c that encircles an outer circumference of the second ring-band shape refracting surface 431b, and a fourth ring-band shape refracting surface 431d that encircles an outer circumference of the third ring-band shape refracting surface 431c. It is noted that the number of ring-band shape refracting surfaces is not limited to the number of the present example.

A step difference d1 is provided in the direction of the lens optical axis L between the first ring-band shape refracting surface 431a and the second ring-band shape refracting surface 431b. Similarly, a step difference d2 is provided in the direction of the lens optical axis L between the second ring-band shape refracting surface 431b and the third ring-band shape refracting surface 431c, and a step difference d3 is provided in the direction of the lens optical axis L between the third ring-band shape refracting surface 431c and the fourth ring band shape refracting surface 431d. Accordingly, the first through fourth ring band shape refracting surfaces 431a, 431b, 431c and 431d are formed in the form of a stair in the direction of the lens optical axis.

Also, each of the first through fourth ring-band shape refracting surface 431a, 431b, 431c and 431d has a refractive power that is generally suitable for the second laser beam to form a beam spot on a recording surface 42a of a DVD 42.

Figure 14:
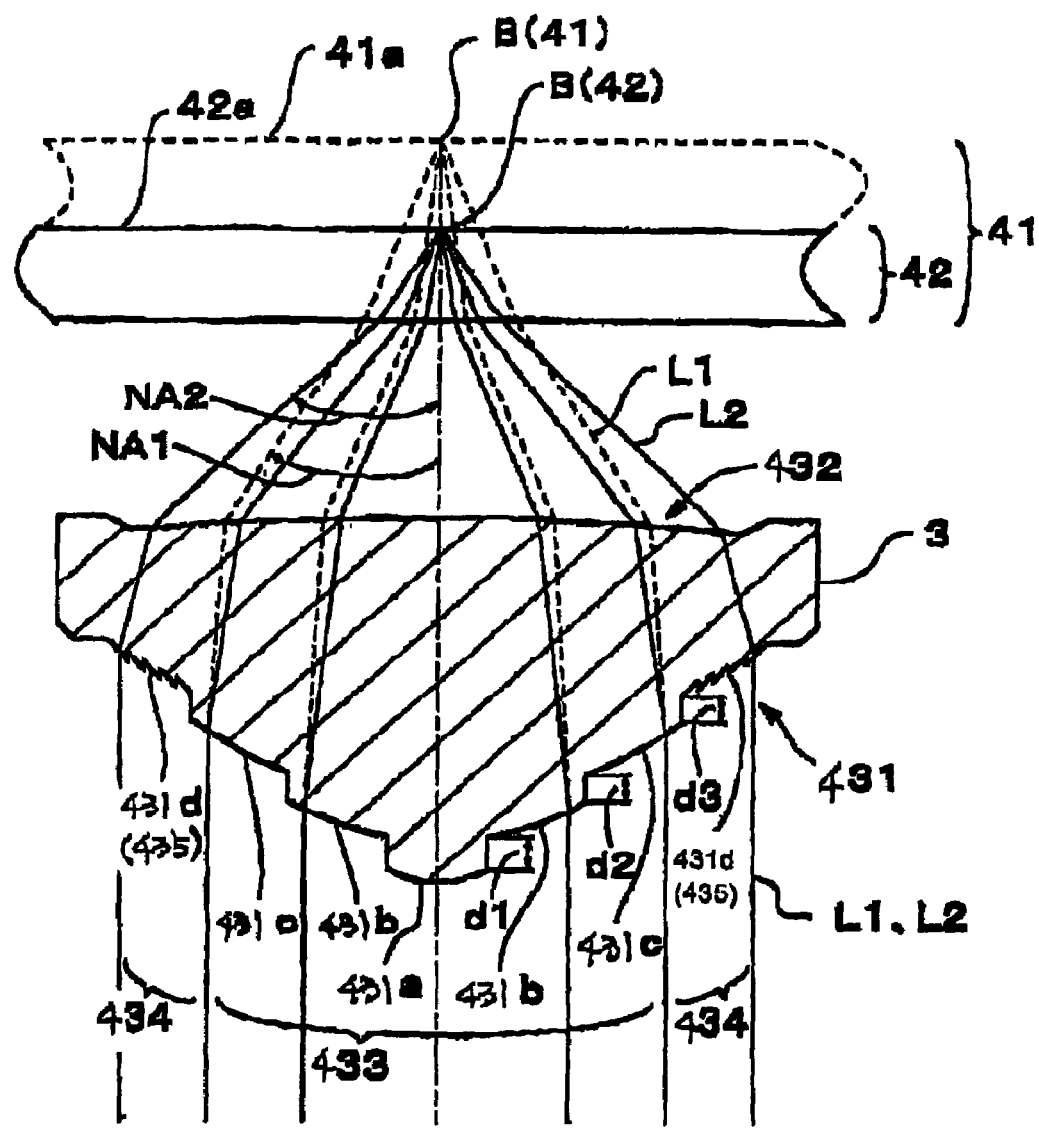
FIG. 14 is an illustration to describe converging states of first and second laser beams by the objective lens indicated in FIGS. 13(*a*), (*b*) and (*c*).

An aperture number that is set for a CD-R 41 that uses the first laser beam L1 is typically 0.5, which may be defined by a portion indicated by NA1 in FIG. 14. In the meantime, an aperture number that is set for a DVD 42 that uses the second laser beam L2 is typically 0.6, which may be defined by a portion indicated by NA2 in FIG. 14. The first, second and third ring-band shape refracting surfaces 431a, 431b and 431c are formed in the central region 433 of the objective lens 3 which corresponds to the aperture number range NA1 set for the CD-R 41; and the first, second and third ring-band shape refracting surfaces are provided with the step differences d1, d2 and d3 that are suitable for forming a beam spot of the first laser beam L1 on the recording surface 41a of the CD-R 41.

Further, a diffraction grating 435 is formed on the fourth ring-band shape refracting surface 431d formed in an outer circumference region 434 that encircles an outer circumference of the central region 433. The diffraction property of the diffraction grating 435 is set such that beam portions of the first laser beam L1 that pass the outer circumference region 434 do not converge at a beam spot forming position on the recording surface 41a of the CD-R 41.

With the optical head device 1 equipped with the objective lens 3 having the composition described above, when reproducing information on the CD-R 41, the first laser beam source 11 is driven to emit the first laser beam L1. Among the first laser beam L1, beam components that pass the central region 433 in the light incident side refracting surface 431 of the objective lens 3 form a beam spot B (41) on the recording surface 41a of the CD-R 41, as indicated by dotted lines in FIG. 13.

Beam components of the first laser beam L1 that pass the outer circumferential region 434 in the light incident side refracting surface 431 of the objective lens 3 are unnecessary light that is outside the region corresponding to the aperture number set for the CD-R 41 with a thick substrate, and therefore affected by the diffraction action of the diffraction grating 435 formed in the outer circumferential region 434 to be diffracted so as not to converge at a beam spot forming position of the beam spot B (41).

When reproducing information on a DVD 42, only the second laser beam source 12 is driven to emit a second laser beam L2. As indicated by solid lines in FIG. 14, a beam spot B (42) is formed on a recording surface 42a of the DVD 42 with beam components of the second laser beam L2 that pass the central region 433. Also, among beam components that pass the outer circumference region 434 where the diffraction grating 435 is formed, a $0^{th}$ order beam component that is not affected by the diffraction action of the diffraction grating 435 formed in the outer circumference region 434 also forms a beam spot B (42).

In this manner, with the objective lens 3 having the composition described above, a beam spot B (41) of the first laser beam L1 is formed on the recording surface 41a of to CD-R 41, and a beam spot B (42) of the second laser beam L2 is formed on the recording surface 42a of the DVD 42, in which both of the beam spots are formed by refraction without using diffraction. Accordingly, the use efficiency of the first laser beam L1 for the CD-R 41 and is the use efficiency of the second laser beam L2 for the DVD 42 are both increased.

As described above, in accordance with the present invention, a refracting surface of an objective lens for an optical head device is divided into two regions, i.e., a central refracting surface region and an outer circumferential refracting surface region, and the refraction property and/or the diffraction property of these central refracting surface region and outer circumferential refracting surface region are utilized to form a beam spot of a first laser beam on a recording surface of a first optical recording medium and a beam spot of a second laser beam on a recording surface of a second optical recording medium. As a result, the composition of the refracting surface is simplified, and designing the refracting surface becomes easier compared to the case of designing a refracting surface of an objective lens with three split surfaces. Also, the light use efficiency is improved.

Also, in accordance with the present invention, a refracting surface of an objective lens may be composed of a plurality of circular band-like refracting surfaces concentrically formed with one another and step differences provided at boundaries of the circular band-like refracting surfaces, wherein a beam spot of a first laser beam is formed on a recording surface of a first optical recording medium and a beam spot of a second laser beam is formed on a recording surface of a second optical recording medium by refraction without using diffraction. In other words, each of the plurality of ring-band shape refracting surfaces to be disposed in a central region and an outer circumferential refracting surface regions of the refracting surface of the objective lens may be designed to have a refraction property that is suitable for the second optical recording medium, and the step differences between the ring-band shape refracting surfaces to be disposed in the central region may be adjusted to provide a refraction property that is suitable for the first optical recording medium. As a result, the first and second laser beams can be converged at focal points without being diffracted, such that the use efficiency of the first and second laser beams can be improved.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical head device that converges first and second laser beams having different wavelengths through a single light converging optical system, the optical head device comprising:

an objective lens composing a part of the light converging optical system, the objective lens including a refracting surface divided into a central refracting surface region with an optical axis thereof being as a center and an outer circumferential refracting surface region that surrounds an outer circumference of the central refracting surface region, and a diffraction grating formed generally entirely over the central refracting surface region, and a second diffraction grating formed over an entire area of the outer circumferential refracting surface region to diffract the first laser beam so as not to converge on a beam spot forming position of the beam spot, wherein the objective lens forms a beam spot of the second laser beam with the $1^{st}$ order diffracted beam obtained by the central refracting surface region and a $0^{th}$ order diffracted beam obtained by the outer circumferential refracting surface region, wherein the objective lens forms a beam spot of the first laser beam at the first focal distance with a $0^{th}$ order diffracted beam or a $1^{st}$ order diffracted beam obtained by the diffraction grating of the central refracting surface region, and the objective lens forms a beam spot of the second laser beam at the second is focal distance with a beam portion that passes the outer circumferential refracting surface region and a $1^{st}$ order diffracted beam obtained by the diffraction grating in the central refracting surface region, and wherein the beam spot of the first laser beam is formed at the first focal distance with the $0^{th}$ order diffracted beam obtained by the diffraction grating of the central refracting surface region.

2. An optical head device according to claim 1, wherein the central refracting surface region has a refractive power that generally forms a beam spot of the first laser beam at the first focal distance, and the outer circumferential refracting surface region has a refractive power that generally forms a beam spot of the second laser beam at the second focal distance.

3. An optical head device according to claim 1, wherein the beam spot of the first laser beam is formed at the first focal distance with the $1^{st}$ diffracted beam of the first laser beam obtained by the diffraction grating in the central refracting surface region.

4. An optical head device according to claim 3, wherein the outer circumferential refracting surface region has a refractive power that generally forms a beam spot of the second laser beam at the second focal distance.

5. An optical head device that converges first and second laser beams having different wavelengths through a single light converging optical system, the optical head device comprising:

an objective lens composing a part of the light converging optical system, the objective lens including a refracting surface divided into a central refracting surface region with an optical axis thereof being as a center and an outer circumferential refracting surface region that surrounds an outer circumference of the central refracting surface region, and a diffraction grating formed generally entirely over the central refracting surface region, and an outer circumferential diffraction grating formed over an entire area of the outer circumferential refracting surface region, wherein the objective lens forms a beam spot of the second laser beam at the second focal distance with the $1^{st}$ order diffracted beam obtained by the central refracting surface region and a $0^{th}$ order diffracted beam obtained by the outer circumferential refracting surface region, wherein the beam spot of the first laser beam is formed at the first focal distance with the $1^{st}$ diffracted beam of the first laser beam obtained by the diffraction grating in the central refracting surface region, and wherein the outer circumferential refracting surface region has a refractive power that generally forms a beam spot of the second laser beam at the second focal distance, and wherein the objective lens forms a beam spot of the first laser beam at the first focal distance with a $0^{th}$ order diffracted beam or a $1^{st}$ order diffracted beam obtained by the diffraction grating of the central refracting surface region, and the objective lens forms a beam spot of the second laser beam at the second is focal distance with a beam portion that passes the outer circumferential refracting surface region and a $1^{st}$ order diffracted beam obtained by the diffraction grating in the central refracting surface region.

6. An optical head device that converges first and second laser beams having different wavelengths through a single light converging optical system, the optical head device comprising:

an objective lens composing a part of the light converging optical system, the objective lens including a refracting surface divided into a central refracting surface region with an optical axis thereof being as a center and an outer circumferential refracting surface region that surrounds an outer circumference of the central refracting surface region, and a diffraction grating formed generally entirely over the central refracting surface region, and an outer circumferential diffraction grating formed over an entire area of the outer circumferential refracting surface region, wherein the objective lens forms a beam spot of the second laser beam at the second focal distance with the $1^{st}$ order diffracted beam obtained by the central refracting surface region and a $1^{st}$ order diffracted beam obtained by the outer circumferential refracting surface region, wherein the beam spot of the first laser beam is formed at the first focal distance with the $1^{st}$ diffracted beam of the first laser beam obtained by the diffraction grating in the central refracting surface region, and wherein the objective lens forms a beam spot of the first laser beam at the first focal distance with a $0^{th}$ order diffracted beam or a $1^{st}$ order diffracted beam obtained by the diffraction grating of the central refracting surface region, and the objective lens forms a beam spot of the second laser beam at the second is focal distance with a beam portion that passes the outer circumferential refracting surface region and a $1^{st}$ order diffracted beam obtained by the diffraction grating in the central refracting surface region.

7. An optical head device that converges first and second laser beams having different wavelengths through a single light converging optical system, the optical head device comprising:

an objective lens refracting surface composing at least a part of the light converging optical system, the objective lens refracting surface including a plurality of ring-band shape refracting surfaces concentrically arranged about an optical axis thereof, and step differences formed in a direction of the optical axis at boundaries of the plurality of ring and shape refracting surfaces, wherein each of the plurality of ring-band shape refracting surfaces has a refractive power that generally forms a beam spot of the second laser beam at the second focal distance, the step differences of the ring-band shape refracting surfaces formed in a central region of the objective lens refracting surface corresponding to an aperture number set for the first focal distance are set such that a beam spot of the first laser beam is formed at the first focal distance, and a diffraction grating is formed on at least one of the ring-band shape refracting surfaces formed in an outer circumference region that surrounds the central region of the objective lens refracting surface, wherein the diffraction grating has a diffraction property that does not allow beam components of the first laser beam that pass the outer circumference region to converge at the first focal distance.

8. An optical head device according to claim 7, wherein each of the step difference and a wavelength .mu.2 of the second laser beam have a relation generally defined by $A\lambda 2/(n-1)$, where A is a positive integer, and n is an index of refraction of the ring-band shape refracting surface.

9. An optical head device according to claim 8, wherein the step difference is defined by $\lambda 2/(n-1)$.

10. An objective lens that converges first beam and second laser beams having different wavelengths, the objective lens comprising:

a refracting surface divided into a central refracting surface region with an optical axis thereof being as a center, and an outer circumferential refracting surface region that surrounds an outer circumference of the central refracting surface region; and a diffraction grating formed generally entirely over the central refracting surface region, wherein the objective lens forms a beam spot of the first laser beam at the first focal distance with a $0^{th}$ order diffracted beam or a $1^{st}$ order diffracted beam obtained by the diffraction grating of the central refracting surface region, and the objective lens forms a beam spot of the second laser beam at the second focal distance with a beam portion that passes the outer circumferential refracting surface region and a $1^{st}$ order diffracted beam obtained by the diffraction grating in the central refracting surface region, wherein the objective lens forms a beam spot of the second laser beam with the $1^{st}$ order diffracted beam obtained by the central refracting surface region and a $0^{th}$ order diffracted beam obtained by the outer circumferential refracting surface region, and wherein the objective lens forms a beam spot of the second laser beam at the second focal distance with the $1^{st}$ order diffracted beam obtained by the central refracting surface region and a $0^{th}$ order diffracted beam obtained by the outer circumferential refracting surface region.

11. An objective lens that converges first beam and second laser beams having different wavelengths, the objective lens comprising:

a plurality of ring-band shape refracting surfaces concentrically arranged about an optical axis thereof, and step differences formed in a direction of the optical axis at boundaries of the plurality of ring-band shape refracting surfaces, wherein each of the plurality of ring-band shape refracting surfaces has a refractive power that generally forms a beam spot of the second laser beam at the second focal distance, the step differences of the ring-band shape refracting surfaces formed in a central region of the objective lens refracting surface corresponding to an aperture number set for the first focal distance are set such that a beam spot of the first laser beam is formed at the first focal distance, and a diffraction grating is formed on at least one of the ring-band shape refracting surfaces formed in an outer circumference region that surrounds the central region of the objective lens refracting surface, wherein the diffraction grating has a diffraction property that does not allow beam components of the first laser beam that pass the outer circumference region to converge at the first focal distance.

* * * * *